United States Patent
Mayhew et al.

(10) Patent No.: US 7,933,696 B2
(45) Date of Patent: Apr. 26, 2011

(54) DISTRIBUTED ARITHMETIC LOGIC UNIT SECURITY CHECK

(75) Inventors: William R. Mayhew, Ann Arbor, MI (US); David W. Wright, Howell, MI (US)

(73) Assignee: GM Global Technology Operations LLC

( * ) Notice: Subject to any disclaimer, the term of this patent is extended or adjusted under 35 U.S.C. 154(b) by 750 days.

(21) Appl. No.: 11/758,762

(22) Filed: Jun. 6, 2007

(65) Prior Publication Data

US 2008/0059016 A1    Mar. 6, 2008

Related U.S. Application Data

(60) Provisional application No. 60/841,610, filed on Aug. 31, 2006.

(51) Int. Cl.
*G01M 17/00* (2006.01)
(52) U.S. Cl. .......................... 701/33; 701/31
(58) Field of Classification Search ............ 701/30
See application file for complete search history.

(56) References Cited

U.S. PATENT DOCUMENTS

| | | | |
|---|---|---|---|
| 4,799,159 A * | 1/1989 | Davidson et al. | 701/14 |
| 4,964,506 A * | 10/1990 | Benford et al. | 192/106 F |
| 5,583,987 A * | 12/1996 | Kobayashi et al. | 714/13 |
| 5,941,612 A * | 8/1999 | Carpenter | 303/122 |
| 5,964,813 A * | 10/1999 | Ishii et al. | 701/35 |
| 6,367,022 B1 * | 4/2002 | Gillespie et al. | 713/300 |
| 6,382,041 B1 * | 5/2002 | Burgbacher et al. | 74/335 |
| 6,456,917 B1 * | 9/2002 | Gierling et al. | 701/51 |
| 6,938,190 B2 * | 8/2005 | Okuda | 714/55 |
| 6,944,779 B2 * | 9/2005 | Alexander et al. | 713/300 |
| 7,211,026 B2 * | 5/2007 | Berger et al. | 477/92 |
| 7,472,051 B2 * | 12/2008 | Mariani et al. | 703/13 |
| RE40,615 E * | 1/2009 | Burgbacher et al. | 74/335 |
| 2001/0016918 A1 * | 8/2001 | Alexander et al. | 713/323 |
| 2002/0062460 A1 * | 5/2002 | Okuda | 714/25 |
| 2002/0099487 A1 * | 7/2002 | Suganuma et al. | 701/48 |
| 2005/0050387 A1 * | 3/2005 | Mariani et al. | 714/13 |
| 2005/0209047 A1 * | 9/2005 | Berger et al. | 477/121 |
| 2007/0112483 A1 * | 5/2007 | Jeong | 701/22 |

FOREIGN PATENT DOCUMENTS

| | | |
|---|---|---|
| CN | 1458889 | 11/2003 |
| CN | 1577197 | 2/2005 |

* cited by examiner

*Primary Examiner* — Thomas G Black
*Assistant Examiner* — Shelley Chen

(57) ABSTRACT

A vehicle diagnostic system is provided. The system includes: a first control module that includes a first processor and that controls a first vehicle subsystem; and second control module that controls a second vehicle subsystem and that validates the functionality of the first processor of the first control module wherein if the second control module determines that the first processor of the first control module is faulty, the second control module shuts down the first control module.

11 Claims, 5 Drawing Sheets

DISTRIBUTED ARITHMETIC LOGIC UNIT SECURITY CHECK

CROSS-REFERENCE TO RELATED APPLICATIONS

This application claims the benefit of U.S. Provisional Application No. 60/841,610, filed on Aug. 31, 2006. The disclosure of the above application is incorporated herein by reference.

FIELD

The present invention relates to vehicle diagnostic systems, and more particularly to a diagnostic system for reducing control module operation faults.

BACKGROUND

The statements in this section merely provide background information related to the present disclosure and may not constitute prior art.

Referring now to FIG. 1, one or more control modules 10 control various subsystems of a vehicle. A control module 10 typically includes a primary processor 12 that includes an arithmetic logic unit (ALU) that is capable of calculating results for a wide variety of arithmetical computations. The calculated results are used by software to control the various electrical and/or mechanical components of the subsystem.

Some conventional control modules 10 include a secondary processor 14. The purpose of the secondary processor 14 is to provide a security check for the ALU of the primary processor 12. For example, the secondary processor 14 can periodically transmit an arithmetic request to the primary processor 12. The primary processor 12 answers by transmitting a calculated result. The secondary processor 14 compares the calculated result to an expected result. When the calculated result equals the expected result, the secondary processor 14 determines that the ALU of the primary processor 12 is operating correctly. Otherwise, when the calculated result does not equal the expected result, the ALU of the primary processor 12 is determined to be faulty. The secondary processor 14 disables the primary processor 12 by switching off the power to the primary processor 12 from a power supply 16.

This type of security check is required for most real time embedded control systems. Providing a secondary processor adds to the overall cost of producing the control module 10.

SUMMARY

Accordingly, a vehicle diagnostic system is provided. The system includes: a first control module that includes a first processor and that controls a first vehicle subsystem; and second control module that controls a second vehicle subsystem and that validates the functionality of the first processor of the first control module wherein if the second control module determines that the first processor of the first control module is faulty, the second control module shuts down the first control module.

Further, a method of detecting a faulty arithmetic logic unit (ALU) of a first control module via a second control module is provided. The method includes: the second control module, transmitting an arithmetic request to the first control module; receiving a response including a result to the arithmetic request from the first control module; and sending a signal to shut down the first control module when the response does not equal a predetermined result.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
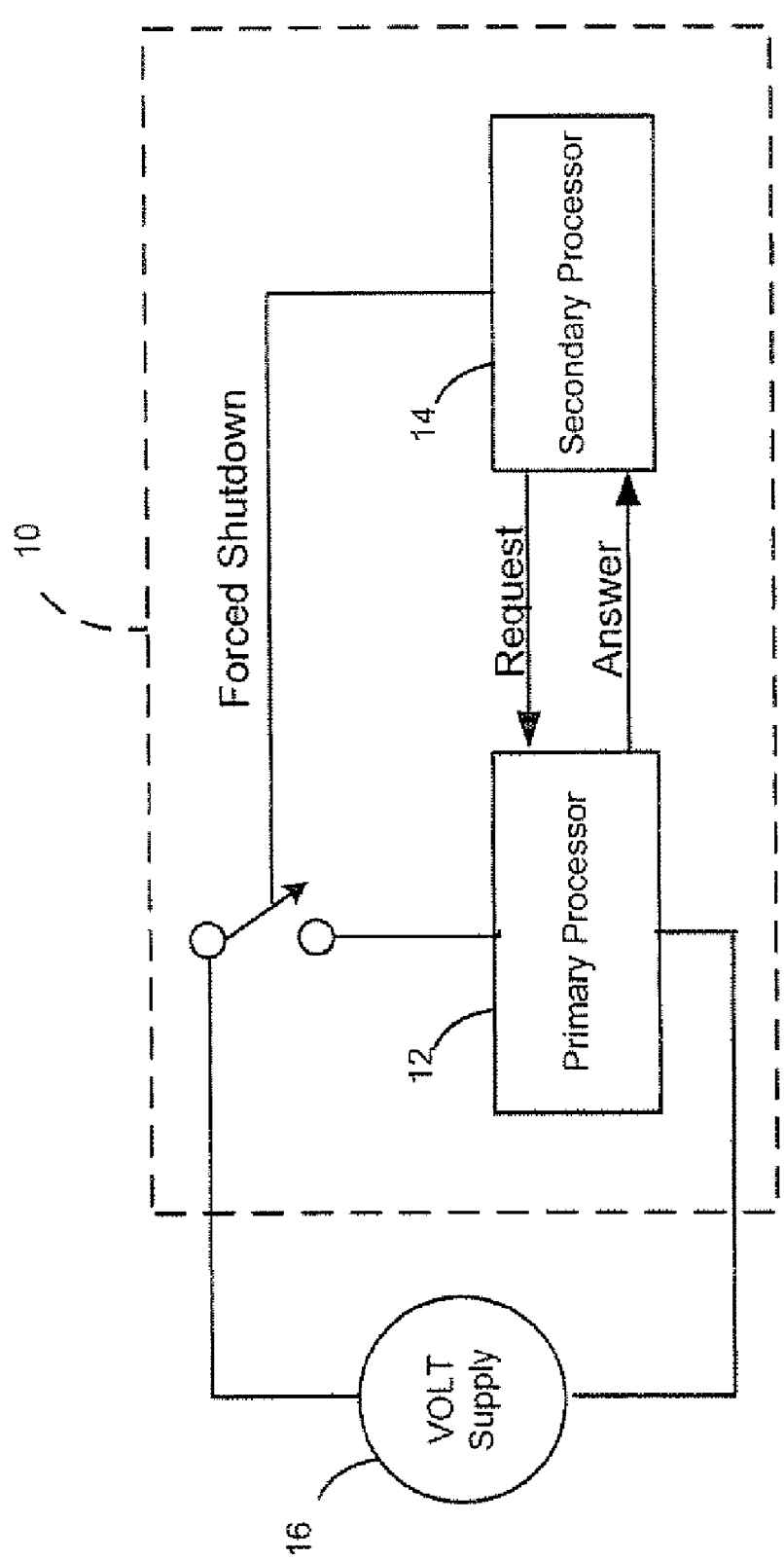
FIG. 1 is a block diagram of an arithmetic logic unit (ALU) security check system of a control module according to the prior art.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Figure 2:
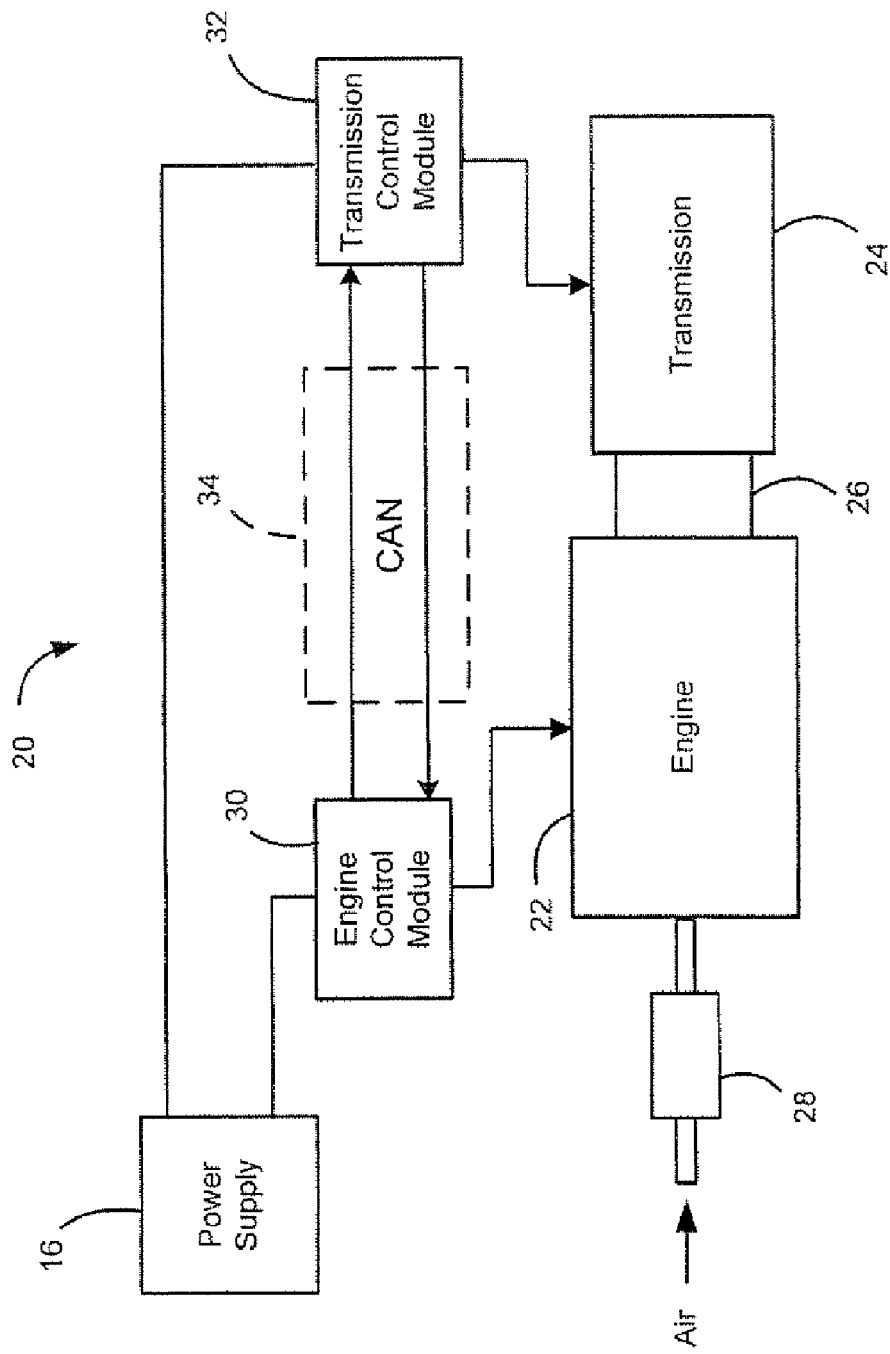
FIG. 2 is a block diagram of an exemplary vehicle including a distributed ALU security check system.

Referring now to FIG. 2, a vehicle 20 includes an engine 22, a transmission 24, and a torque converter 26. The engine 22 combusts an air and fuel mixture within cylinders (not shown) to produce drive torque. Air is drawn into the engine through a throttle 28. The torque converter 26 transfers and multiplies torque from the engine 22 to the transmission 24. The transmission 24 includes one or more gear sets that transfer torque to a driveline (not shown) based on a desired speed.

The vehicle 20 further includes two or more control modules that control various subsystems within the vehicle. The processor of one control module can be used to perform an ALU security check on the processor of the other control module and vice versa. For example, as shown in FIG. 2, an engine control module 30 controls the operation of the engine 22. A transmission control module 32 controls the operation of the transmission 24 and/or torque converter 26. The engine control module 30 and the transmission control module 32 communicate via a controller area network (CAN) 34. As can be appreciated, various communication protocols may be used to facilitate the communication between the control modules 30 and 32. The transmission control module 32 performs the ALU security check for the engine control module 30 and vice versa. Therefore, the ALU security check system is distributed amongst two or more control modules thereby eliminating the need for a secondary processor within each control module 30 and 32.

Figure 3:
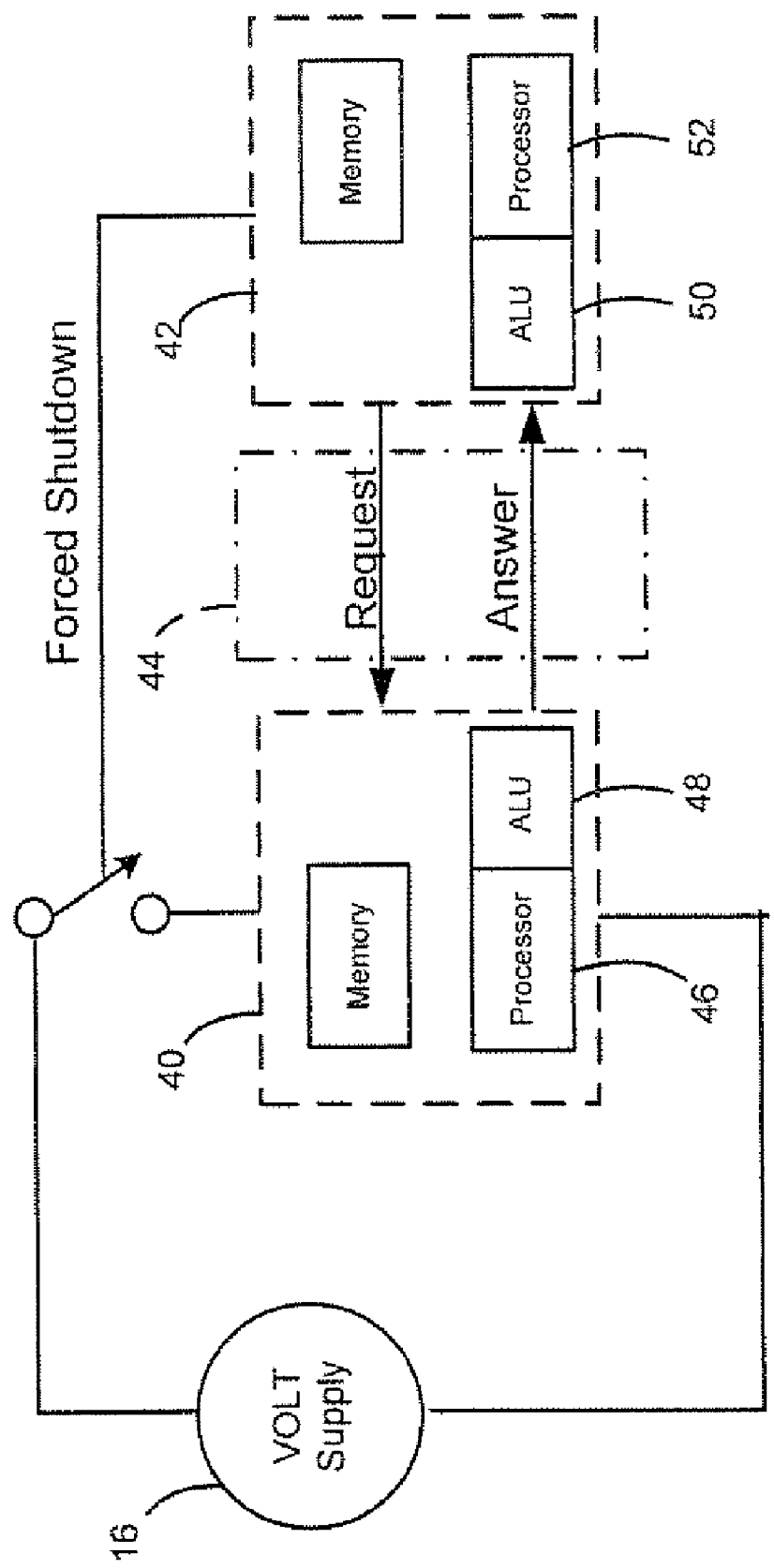
FIG. 3 is a detailed block diagram of a distributed ALU security check system.

Referring now to FIG. 3, a distributed ALU security system is illustrated in greater detail. A first control module 40 electronically communicates with a second control module 42 via a communications network 44. The first control module 40 includes a first processor 46 and a first ALU 48. The second control module 42 includes at least a second processor 52 and a second ALU 50. The second control module 42 can be an independent secure system including a secondary processor (not shown) for performing its own ALU security check. In various other embodiments, the second control module 42 relies on the distributed ALU security check system to diagnose the second ALU 50. For ease of discussion, the second control module of FIG. 3 will be discussed as a secure system.

The first control module 40 calculates various arithmetic results that control a first vehicle subsystem. The second control module 42 operates similar to the first control module 40 and controls a second vehicle subsystem. The second control module 42 transmits a request signal requesting a predetermined result to a predetermined equation, formula and/or function. The first control module 40 calculates the result and transmits the answer to the second control module 42. The second control module 42 compares the answer to a predetermined result. When the calculated result does not equal the expected result, the second control module 42 determines the first ALU 48 to be faulty.

Thereafter, the second control module 42 may turn off the voltage supply to the first control module 40, forcing the first subsystem to operate in a default mode. In various embodiments, the second control module 42 can shut down the first control module 40 by an internal but independent process within the first control module 40 (not shown) or by an external method, separate from the first control module 40, as shown in FIG. 3. In various other embodiments, the second control module 42 may command a running reset to the first control module 40 causing the first subsystem to reset.

Figure 4:
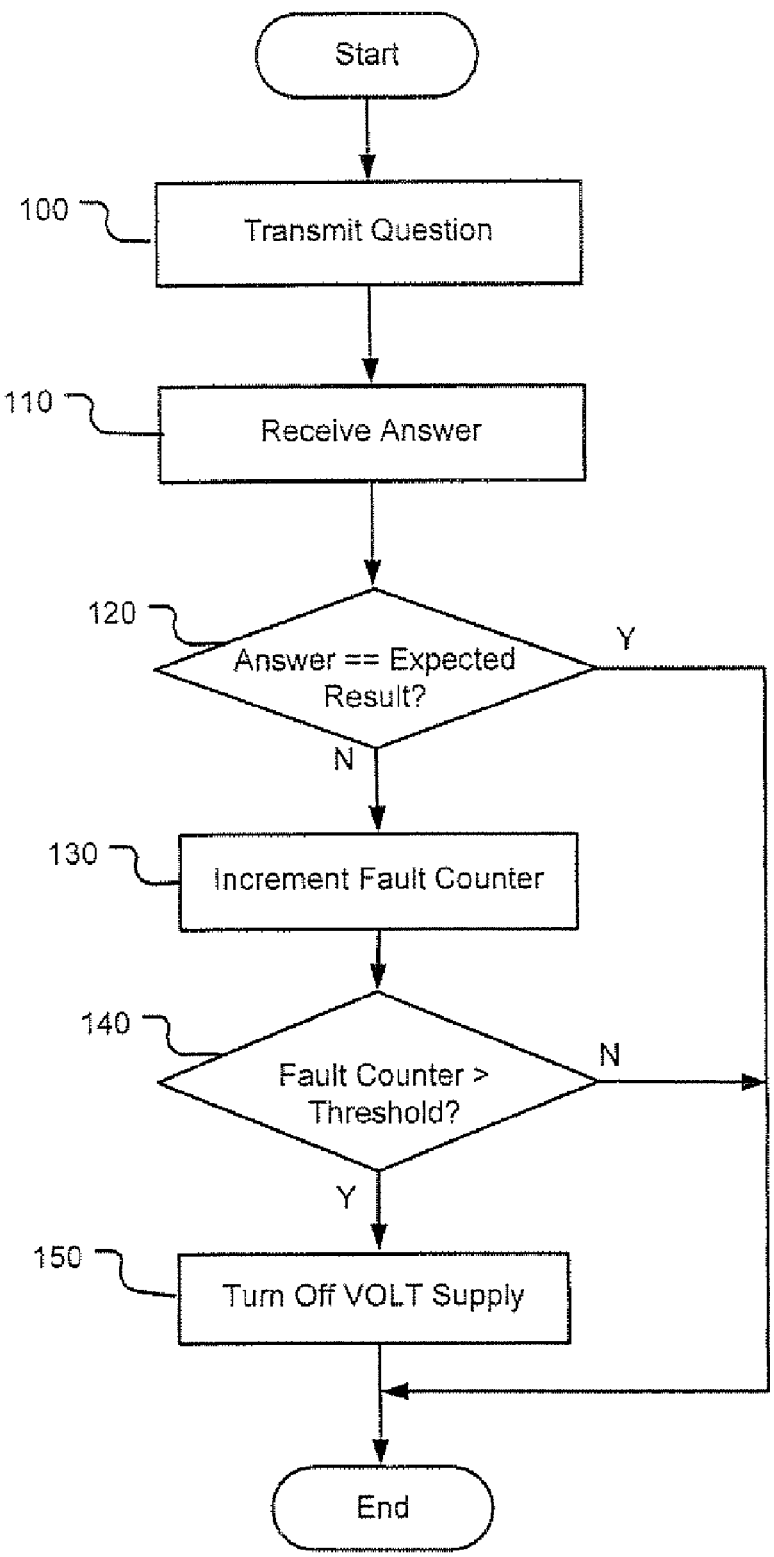
FIG. 4 is a flowchart illustrating a method performed by a second control module of the distributed ALU security check system.

Referring now to FIG. 4, FIG. 4 is a flowchart illustrating a method performed by the second control module 42 of the distributed ALU security check system. The method can be run periodically while the vehicle 20 is turned on. In various other embodiments the method may be run upon initiation by an external request. For example, a vehicle technician may connect a diagnostic tool to the vehicle and generate an ALU validity check request which initiates the method.

Control transmits a request to calculate a predetermined arithmetic operation at 100. Control receives an answer to the request including a calculated result at 110. Control compares the calculated result with a predetermined expected result at 120. If the calculated result equals the expected result, control determines the first ALU to be operating properly. When the calculated result does not equal the expected result, control determines the ALU functionality of the first control module to be faulty. A fault counter is incremented at 130. If the fault counter exceeds a predetermined threshold at 140, control disables the first control module at 150.

Figure 5:
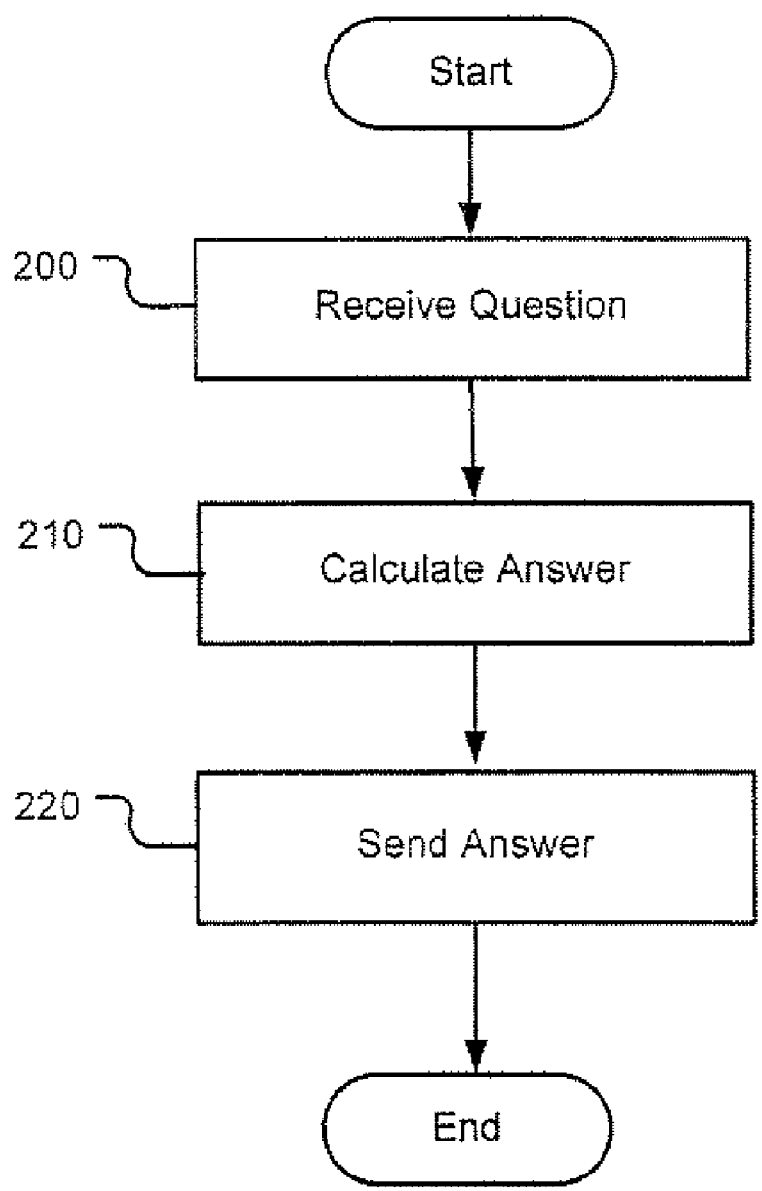
FIG. 5 is a flowchart illustrating a method performed by a first control module of the distributed ALU security check system.

FIG. 5 is a flowchart illustrating a method run by the first control module of the distributed ALU security check system. The method can be initiated based on the request received from the second control module. Control receives a request to perform a predetermined calculation at 200. Control calculates an answer based on the predetermined calculation at 210. Control transmits the predetermined calculation at 220.

Once the ALU of the first control module is determined to be faulty, a diagnostic code indicating the fault can be set. In various embodiments, the diagnostic code can be retrieved by a service technician via a tech tool connected to the vehicle. In various other embodiments, the diagnostic code can be transmitted wirelessly to a remote technician. In various other embodiments, an audio or visual warning signal may be generated via an instrumentation panel of the vehicle to indicate to the driver that a malfunction of the vehicle has occurred.

Those skilled in the art can now appreciate from the foregoing description that the broad teachings of the present disclosure can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle diagnostic system, comprising:
   a first control module that includes a first processor and that controls a transmission of a vehicle but not an engine of the vehicle; and
   a second control module that controls the engine of the vehicle but not the transmission of the vehicle and that validates the functionality of an arithmetic logic unit (ALU) of the first processor of the first control module wherein if the second control module determines that the ALU is faulty, the second control module shuts down the first control module, and wherein the first and second control modules are distributed and located remotely with respect to each other.

2. The vehicle diagnostic system of claim 1 wherein the second control module sends an arithmetic request to the first control module, receives a response to the request from the first control module, and detects a faulty ALU when the response does not equal a predetermined result.

3. The vehicle diagnostic system of claim 2 wherein the second control module repeats the sending of an arithmetic request to the first control module and receiving a response to the request from the first control module and wherein the second control module detects a faulty ALU when the response does not equal a predetermined result a predetermined number of times.

4. The vehicle diagnostic system of claim 1 wherein the first control module receives an arithmetic request, calculates a response based on the request, and transmits the response to the second control module.

5. The vehicle diagnostic system of claim 1 wherein the second control module shuts down the first control module by turning off a voltage supply to the first control module via a system external to the first control module.

6. The vehicle diagnostic system of claim 1 wherein the second control module shuts down the first control module by turning off a voltage supply to the first control module via sending a signal to a system internal to the first control module.

7. The vehicle diagnostic system of claim 1 wherein the second control module commands a reset of the first control module.

8. The vehicle diagnostic system of claim 1 wherein the second control module sets a diagnostic code when the ALU is determined to be faulty.

9. The vehicle diagnostic system of claim 1 wherein the second control module sends a signal to illuminate an indicator lamp when the ALU is determined to be faulty.

10. The vehicle diagnostic system of claim 1 wherein the second control module sends a signal to initiate an audio warning signal when the ALU is determined to be faulty.

11. The vehicle diagnostic system of claim 8 wherein the second control module transmits the diagnostic code to a remote location according to a wireless protocol.

\* \* \* \* \*